United States Patent [19]

Richter et al.

[11] 3,962,465

[45] June 8, 1976

[54] METHOD OF PRODUCING STARCH HYDROLYSIS PRODUCTS FOR USE AS A FOOD ADDITIVES

[75] Inventors: Manfred Richter; Friedrich Schierbaum, both of Potsdam; Siegfried Augustat, Potsdam-Rehbrucke; Klaus-Dieter Knoch, Berlin, all of Germany

[73] Assignee: Akademie der Wissenschaften der DDR, Berlin, Germany

[22] Filed: Aug. 27, 1973

[21] Appl. No.: 391,711

[52] U.S. Cl.................................. 426/48; 127/29; 195/31 R; 426/573; 426/578; 426/658; 426/661
[51] Int. Cl.²....................................... C12D 13/02
[58] Field of Search............... 195/31 R; 127/34, 38, 127/29, 30; 426/48, 215, 213, 350, 658, 661, 573, 578; 260/233.5

[56] References Cited
UNITED STATES PATENTS

| 3,425,909 | 2/1969 | Speakman et al.............. | 195/31 R |
|---|---|---|---|
| 3,525,672 | 8/1970 | Wurzburg et al................ | 195/31 R |
| 3,689,361 | 9/1972 | Speakman et al.............. | 195/31 R |
| 3,692,580 | 9/1972 | Hirao et al...................... | 127/29 X |
| 3,756,919 | 9/1973 | Deaton et al. .................. | 195/31 R |
| 3,804,716 | 4/1974 | Langlois.......................... | 195/31 R |
| 3,821,423 | 6/1974 | Farkas ............................. | 426/351 |

FOREIGN PATENTS OR APPLICATIONS

| 789,003 | 7/1968 | Canada........................... | 260/233.3 |

*Primary Examiner*—A. Louis Monacell
*Assistant Examiner*—Thomas G. Wiseman
*Attorney, Agent, or Firm*—Nolte and Nolte

[57] ABSTRACT

Food additive, having utility for example as a thickener is prepared by mixing an optimum concentration of a starch-hydrolyzing enzyme and a starch or pretreated starch in water in a concentration of the starch of 15–50% by weight at a pH optimum for the enzyme, heating the mixture to a temperature at which the starch grains swell and permitting the starch to hydrolyze, inactivating the enzyme by additional heating of the mixture, and cooling the mixture to form a gel or dehydrating the mixture to form a dry hydrolyzate.

12 Claims, No Drawings

METHOD OF PRODUCING STARCH HYDROLYSIS PRODUCTS FOR USE AS A FOOD ADDITIVES

This invention relates to a method for the production of starch hydrolysis-products having a low dextrose equivalent (DE), which are suitable to form with water thermoreversible secondary valence gels that can be used with advantage as body- and consistency-imparting vehicles or additives, i.e., thickeners, in foodstuffs and foodstuff preparations.

The production of starch hydrolysis products having a low DE (range 5–25%) is known in itself. Acid-hydrolytic and enzymatic methods are used for the hydrolysis of all known starches, preferably of the waxy cereal starches. In one reaction for the production of starch hyrolyzate-compositions having a low DE, a starch, which was dissolved in an aqueous medium at a temperature above its gelatinizing temperature, is liquefied and hydrolyzed by bacterial α-amylase at a temperature of less than 95°C to a DE value between 5 and 25%. In another reaction for the production of highly concentrated dextrin solutions for the paper industry, a potato starch suspension is first degraded so far, at a temperature which is below the gelatinization temperature, with α-amylase at 59°C that the suspension assumes such a viscosity in the subsequent temperature increase above the gelatizanation point that it can be stirred. In a second degradation stage, the hydrolysis is then continued at about 75°–80°C until the desired end viscosity is obtained and the enzyme is inactivated by the addition of ferment poisons, oxidants or acids.

The known methods lead to starch degradation products which form with water at concentrations above about 30% by weight viscous solutions which are characterized by high stability to freezing, defrosting and heating processes, high clarity, crystallization-inhibiting action, and by the property that they do not solidify to a gel, even in very high concentrations. Because of their lack of shape stability, such starch degradation products cannot be used as thickeners for foodstuff preparations.

It is also known that undegraded cereal starches yield dimensionally stable puddings with gel-like properties after gelatinization in water at concentrations of about 8–12% by weight. The same properties as in cereal starches are also found in potato starches which have been slightly modified by suitable treatment with chemicals (so-called potato starch flour). Gel-like preparations can also be obtained from non-gelling starches, particularly waxy cereal starches, after functional groups have been introduced by a chemical derivatization process.

The main disadvantage of the above mentioned starches is that their gels produced with water are not suitable as vehicles or additives in foodstuffs and foodstuff preparations if they are subjected to the influence of temperatures below the freezing point or to prolonged storage at room- or refrigerator-temperature. These gels and starch dispersions undergo irreversible conversions on freezing, and the starch has, after defrosting, the form of a water-insoluble spongy mass. When these starch gels are stored, for example, as puddings or edible pastes, the high-molecular starch components associate, forming hydrogen bridge bonds, and the consistency changes to such an extent that the gel becomes hard and repels water. The appearance and other sensory properties are negatively influenced. None of the above mentioned changes can be reversed by heating.

Other disadvantages of native starches are that their gel-like preparations very frequently have a typical, pasty-sticky consistency and a characteristic taste. These products are not suitable for use in foodstuffs or foodstuff preparations where it is important that the foodstuffs or foodstuff preparations maintain their shape after spreading or extruding. An additional disadvantage of the above mentioned products is that after gelling no phase transformation can be achieved by heating, which renders the subsequent homogeneous incorporation of solid or dissolved ingredients, like salt, sugar, colorants, preservatives and the like, to a great extent difficult, if not impossible.

The main disadvantage of starches into which functional groups having cations capable of dissociation have been introduced by derivatization, for example, carboxymethyl starch or phosphoric esters of the starch, is that the consistency properties of their aqueous preparations depend to a great extent on the pH-value, and that they are greatly influenced by salts.

The object of the invention is to eliminate the above indicated shortcomings of the presently known starches, starch derivatives and starch hydrolysis-products to such an extent that preparations can be produced which form with water white, glossy thermoreversible gels having a neutral taste, which are stable to freezing and defrosting and the consistency of which can be varied from pasty to cutting-hard.

The invention is based on the problem of providing a method according to which starches or low substituted starch derivatives are converted by enzymes or by other means into mixtures of products of different degrees of degradation, which differ considerably from each other in their degree of polymerization. These degradation products must be to a great extent free of D-glucose and maltose as well as of odor- and taste-intensive substances.

According to the invention the method for the production of starch-hydrolysis products having a low dextrose equivalent, whch are called hereafter SHP, is carried out by first suspending starches, preferably bulb and root starches, if necessary in derivatized or other pretreated form, in water to a solids concentration of 15–50% by weight.

The starch suspension is mixed at the optimum pH value for the enzyme used, preferably about 7, with starch hydrolyzing enzymes, preferably bacterial-α-amylase, in an optimum concentration determined by preliminary tests and subsequently heated to temperatures at which the starch grains swell, preferably to temperatures of 55°–70°C. Within a short time of preferably 5–30 minutes the starch is hydrolyzed. Then the suspension is heated from a temperature of 70°C to temperatures of 95° to 100°C in a period of 5 to 20 minutes and, preferably, in a period of 12 to 15 minutes. After inactivation of the enzymes by heat, followed by coagulation and separation of the protein substances, the latter being carried out, if necessary, after introduction of additives, the hydrolyzate is gelled by cooling, or it is converted into a dry preparation by withdrawing water according to known methods.

The SHP can also be obtained according to the invention by mixing starches of different degrees of degradation, which differ in their degrees of polymerization by at least one order of magnitude, if necessary after the introduction of additives. As the high-molecular starches for the mixtures may be used all native or suitably derivatized starches of different vegetable origin as well as the products of partially degrading the starches by any suitable method, either alone or in combination with each other. As low molecular components of the mixture can be used all substances which greatly inhibit an intermolecular association of the above mentioned high molecular substances, effected by hydrogen bridge bonds.

In the production of SHP by mixing high- and low-molecular starch products, one of these two components can be partly or completely replaced by other substances, preferably by polysaccharides or their degradation products. As high-molecular components can be used all subtances which can form secondary valence gels by the formation of hydrogen bridge bonds, for example microbial polysaccharides, pectins, as well as their high-molecular degradation products. As low-molecular components can be used for example extensively degraded starch hydrolysis products in hydrated form.

Highly suitable as a starting substrate among the bulb- and root-starches for the starch hydrolysis products to be produced according to the invention is potato starch, where starch concentrations of 25–30% by weight have proved particularly favorable. Beyond that, low-substituted starch derivatives the functional groups of which are nutrition-physiologically harmless and which can be degraded by $\alpha$-amylases, preferably phosphate and acetyl starches, are suitable as starting substrate. Similarly, starches can be used the swelling temperature range of which has been changed, compared to untreated starches, by certain preliminary measures, preferably by artificial aging by means of heat-moisture treatment or by modification of the viscosity behavior by means of calcium or other ions. For each starting substrate to be subjected to enzymatic degradation and for each enzyme preparation it is necessary to determine the optimum enzyme concentration. The special temperature-time schedule of the enzymatic degradation is determined in a consistency recording apparatus, for example in the Brabender viscograph, and applied in analogy to the technical method. To this end, the amount of enzymes is varied in new small batches with a constant degradation schedule until the SHP obtained after inactivation of the enzyme solidifies after cooling to a secondary valence gel which is, on the other hand, completely and clearly soluble after heating to temperatures of 80°C.

According to the invention, the degradation temperature is kept at first preferably at a level which is 1°–4°C below the bottom of the swelling temperature range, and the degradation is continued at rising temperatures up to the upper limit of the swelling temperature range of the starch grains continuously or with one or several stoppages until all irreversibly swollen starch grains are dissolved. According to the invention, the heterogeneous enzymatic hydrolysis is so effected that one part of the starch polysaccharides, namely the part in solution, is much faster and more extensively degraded by the enzyme than the other part of the starch polysaccharides, the latter which is in the solid phase inside the swollen grains. Due to these two different physical forms of the substrate, the enzymatic degradation leads to hydrolysis products with the desired distribution of molecular sizes, but care must be taken that the character of this distribution is not changed again later by a too long incubation period in the optimum temperature range of the bacterial-$\alpha$-amylase, which is with high substrate concentrations between about 80° and 87°C. For this reason, it is of paramount importance for the method according to the invention that this temperature range is traversed rapidly in the inactivation of the enzymes.

The complete inactivation of the enzyme is effected by heating the starch hydrolyzate for 15–20 minutes to temperatures of 95° to 100°C. The coagulable substances, preferably the proteins present in the bulb and root starches as accompanying substances and the enzyme protein, flocculate and are separated in known manner from the hydrolyzate, if necessary after the addition of deodorizing and/or decoloring substances. This hydrolyzate is converted either by cooling into a gel or by dehydration into a dry product. The dehydration is effected preferably by spray-drying. Drumor freeze-drying have also proved expedient.

Into the SHP according to the invention, other substances can be introduced already during the production of the SHP, such as nutrients and additives, foodstuffs, foodstuff preparations and enzymes. This is particularly important when small amounts of certain substances such as colorants, preservatives, emulsifiers, stabilizers and the like must be added to the SHP. Preferably, these additions are made to the SHP solutions prior to the further processing of the solution.

The SHP according to the invention have DE-values below 25%, preferably 5–8%. Products the DE of which are within the range of 5–8%, contain components which form colored complexes with iodine. In the case of SHP produced from potato starch, these complexes have with iodine normalities of $4 \cdot 10^{-4}N$ in the wavelength range of 530 to 550 nm an absorption maximum which is displaced toward smaller wavelengths when the iodine concentration increases.

The SHP produced according to the invention with DE-values of 5–8% are not hygroscopic and yield after dissolution in water, in dependence on the SHP concentration, upon cooling pasty to cutting-hard white-glossy gels, if a certain concentration, of preferably 15–40% by weight, is provided. Below about 15–18% by weight, pulpy consistencies are obtained. In order to obtain pasty, spreadable, shape-keeping masses with the common nutrient fats, a consistency similar to butter, margarine or lard, the dry substance content of aqueous SHP preparations is standardized to values between 25 and 30% by weight. If the DE-value of the SHP is outside the range of 5–8%, the dry substance content must be varied correspondingly to obtain products with the same consistency properties.

A considerable change in consistency occurs when these gels are heated. In the temperature range of 50°–70°C the SHP gels melt, forming optically clear aqueous solutions (sols). On recooling, the solution solidifies again to a gel. The finished gels can be frozen and stored in this form. After defrosting the original consistency of the gels is restored.

The SHP gels have the special properties that they can be mixed completely with the common nutrient fats, such as butter, margarine and lard, and partly with vegetable oils, and that they show no phase separation in this form, even when stored for long periods of time at room or refrigerator temperatures.

Due to the above mentioned properties, the SHP can be used in dry form or prepared with water, preferably in gel form, as vehicles or additives for foodstuffs and foodstuff preparations, if necessary by adding fats, fatty acids, medium-chain triglycerides, proteins, protein hydrolyzates, amino acids, carbohydrates, salts, acids, colorants, flavorings, vitamins, enzymes, hormones, emulsifiers, stabilizers, preservatives, ethanol and the like.

One field of application is based on the lack of hygroscopy and the good water solubility of the SHP. They can be used with advantage as drying aids and as a vehicle in the dehydration of sensitive substances, for example, in the spray-drying of seasonings, instant beverages (coffee, tea, cocoa, fruit drinks), spices, flavors, enzymes as well as fruit and vegetable homogenates or concentrates.

Other applications are use of the gels or hydrolysis products as thickeners, stabilizers, body-imparting and water-binding additives for puddings, creams, soups, sauces, coffee lighteners, ice cream mixes, fruit drinks, vegetable concentrates, milk drinks, canned and prepared dishes. Advantages to be mentioned in this range of application are the freezing-defrosting reversibility of the gels, and that they are miscible with aqueous liquids in any ratio, due to their meltability. This is of advantage, for instance in the use of SHP as an essential sauce component in canned fish, meat, vegetable and fruit dishes, where the tissue water issuing during the sterilization must be absorbed by the sauce without phase separation.

Additional uses for the SHP produced according to the invention result from the fact that their aqueous preparations are miscible with proteins, since concentrated protein solutions, such as the yellow and the white of an egg, can be worked into the SHP gels, or SHP dry products can be dissolved in diluted aqueous protein solutions, such as milk, and the mixtures can be made to gel.

In many of the above mentioned uses it is of great importance that the consistency of the SHP gels is insensitive to the influence of the additions of salts and acids necessary in numerous food preparations. The SHP according to the invention are characterized by neutral taste and by their consistency and melting behavior in the mouth, which comes close to the natural nutrient fats. Similarly to the natural spreadable fats, the gels according to the invention require no further additions to produce turbidity and gloss. Due to these special properties, the gels according to the invention can be used as fat substitutes wherever the fat acts in conventional manner as a consistency former: in cake creams and fillings, garnishments, mayonnaise and remoulades, cream cheeses and other cheese preparations, bread spreads, pastes, meat and sausage products and whipped cream. The use of these gels as a substitute for nutrient fats or proteins in these products offers the technological advantage that the consistency can be adapted to the respective need on the basis of the dry substance content. There is achieved, furthermore, an improved consistency-stability during storage at room, refrigerator or freezer temperatures.

Beyond these technological advantages, the considerable value of the SHP produced according to the invention consists in that they offer extensive new possibilities for the preparation of reduced fat and, thus, low-calorie foods. The considerable reduction in calories is achieved since the gels contain about 75% water and their dry substance consists of an easily digestible carbohydrate whose calorie content is only about half that of fat.

The SHP produced according to the invention are not changed in the chemical structure of their basic building block, that is, of the anhydro-D-glucose- ring, so that they do not differ in this respect from the undecomposed starting substrates and can therefore be hydrolyzed, like the latter, partly or completely by means of starch-degrading enzymes. Particularly when the exclusively saccharifying enzyme glucoamylase is used, an SHP produced from non-derivatized starch can therefore be decomposed almost 100% to D-glucose.

But in the degradation with $\beta$-amylase there are obtained hydrolyzate compositions which, unlike the hydrolyzates obtained directly from starch, contain only low molecular $\beta$-limit dextrins, apart from the main product maltose. These hydrolyzate compositions can be used in known manner as additives or raw materials for foodstuffs and foodstuff preparations.

Specific embodiments of the invention are described in the following examples, in which all proportions are by weight, unless otherwise indicated.

EXAMPLE 1

270 g. potato starch (18.5% moisture) are suspended in a 1 liter three-necked flask in 630 ml. water and the pH is set to 7 by means of 1 N soda lye (dry substance content of the suspension = 24.4% by weight). After addition of 0.56 ml. proteinase-free Novo bacterial-$\alpha$-amylase Liq. 60 as an enzyme preparation having an activity of 58.6KNU/g. (1 KNU = 1 kilo Novo unit and corresponds to 0.0189 conventional SKB units), which is equivalent to a concentration of 0.172 KNU/g. dry starch substances in the charge, the reaction vessel with its contents is heated in two stages under mechanical stirring by means of a fiberglass mushroom hood heater (220 V., 400 W., 3 heating stages) as follows:

a. heating of the system at a heating rate of 0.9°C per minute (heating stage 1) to 62°–64°C;
b. additional heating of the system at a heating rate of about 4°C per minute (heating stage 2) from 64°C to 100°C and keeping this temperature for 15 min. for the complete inactivation of the enzyme and for coagulating the proteins (heating stage 3).

In this procedure the reaction time during the degradation in the heterogeneous phase (temperature range 59°–70°C) is 8.2 minutes. The temperature range of 70°–90°C (homogeneous phase) is covered in 12 minutes.

The hydrolyzate obtained is subsequently centrifuged to separate the protein, concentrated by evaporation under vacuum to a dry substance content of about 50% by weight, poured into dishes, dried in an air conditioning cabinet with air circulation for 24–48 hours at 50°C, ground and sifted. The starch hydrolysis product has a residual moisture content of 8.2% and a DE-value of 5.2%.

EXAMPLE 2

5.68 kg. potato starch (12.0% moisture) are suspended in a 20 l. glass swing bucket in 10.98 l. water and the pH is set to 7 (dry substance content of the suspension equals 30% by weight). After addition of 9.28 ml. proteinase-free Novo-bacterial-$\alpha$-amylase Liq. 60, corresponding to a concentration of 0.125 KNU/g. dry starch substances in the charge, the suspension is heated under stirring (stirrer having a 120 mm. blade, 200–280 rpm) according to the following schedule by direct introduction of vapor:

a. heating to 59°C at a rate of 1.5°C per minute;

b. holding this temperature for 10 minutes;
c. heating to 63.5°C within 3 minutes;
d. holding this temperature for 10 minutes;
e. heating to 90°C at a rate of 1.4°C per minute;
f. heating for another 10 minutes at 100°C and holding this temperature for 20 minutes.

In this schedule the reaction time during the degradation in the heterogeneous phase (temperature range 59°–70°C) is 28.4 minutes. The temperature range of 70°–90°C (homogeneous phase) is covered in 15 minutes.

The volume of the charge increases from originally 14.6 liter to 18.3 liter, the dry substance content drops correspondingly to 28.2% by weight. The hydrolyzate is filtered hot through a Dederon filter cheese cloth, concentrated under vacuum to a solids content of 45% by weight, and further dried on a test drum drier (drum heater 220 V., 3.3 KW, 3 heating stages) at a drum temperature of 115°–125°C and a charging rate of 30 ml./min. The SHP has a residual moisture content of 8.2%, a crude protein content of 0.1% and a DE-value of 8.1%.

The SHP produced according to Examples 1 and 2 yield in 0.1 N hydrochloric acid with iodine-potassium iodide solution colored complexes with the values of the parameters for the wavelength of the absorption maximum ($\lambda_{max}$ in nm) and the maximum extinction coefficient ($\epsilon_{max}$), which were measured at two different iodine normalities and are indicated in the table, expressed as extinction for 1 mg. SHP in 100 ml. iodine-potassium iodide solution with a molar iodide-iodine ratio of 1.5 at a layer thickness of the solution of 1 cm.:

| Starch hydrolysis product according to | DE (%) | Measured at the iodine-normality $4 \cdot 10^{-3}$N | | Measured at the iodine-normality $4 \cdot 10^{-4}$N | |
|---|---|---|---|---|---|
| | | $\lambda_{max}$ (nm) | $\epsilon_{max}$ | $\lambda_{max}$ (nm) | $\epsilon_{max}$ |
| Example 1 | 5.2 | 527 | 0.112 | 546 | 0.061 |
| Example 2 | 8.1 | 503 | 0.095 | 532 | 0.043 |

EXAMPLE 3

170 g. potato starch (15.6% moisture) are stirred in a beaker with 328 ml. water to a homogeneous suspension (dry substance content of the suspension 28.8% by weight), the pH of the suspension is set to 7 by means of 2 N sodium carbonate solution, and the suspension is transferred to the measuring pot of a Brabender Viscograph (measuring cell with a sensitivity of 700 cm. · g.). After adding different amounts of Novo bacterial-α-amylase Liq. 60 (see table), the system is heated at a rate of 1.5°C per minute with stoppages according to the following schedule, and the consistency is recorded as a function of the time:

a. heating to 59°C;
b. constant temperature for 15 minutes;
c. heating to 63.5°C;
d. constant temperature for 5 minutes;
e. heating to 65°C;
f. constant temperature for 5 minutes;
g. heating to 68°C;
h. constant temperature for 5 minutes;
i. heating to 90°C.

In this program the reaction time during the degradation in the heterogeneous phase (temperature range 59°–70°C) is 37.3 minutes. The temperature range of 70°–90°C (homogeneous phase) is covered in 13 minutes.

The charge is transferred to a beaker, boiled for 15 minutes, and placed after cooling in a refrigerator for gelling. The table contains the consistency maxima achieved with three different amounts of the enzyme, as well as the appearance of the sol obtained by heating the respective gel to 80°C.

| Amount of enzyme (ml.) | Brabender units at the constant temperature stages | | | Appearance of sol at 80°C |
|---|---|---|---|---|
| | 63.5°C | 65.0°C | 68.0°C | |
| 0.25 | 50 | 100 | 100 | clear |
| 0.22 | 210 | 150 | 240 | clear |
| 0.20 | 100 | 490 | 260 | cloudy |

In this example 0.22 ml. enzyme solution is necessary to obtain degradation products which can form thermo-reversible secondary valence gels.

EXAMPLE 4

From the SHP produced in Example 2 are prepared gels having different dry substance contents by converting the corresponding amount of the dry product with a weighed amount of water under stirring and heating in a water bath to 80°C into a clear solution. For a determination of the gel strength, 70 ml. of the solutions are charged into a Ridgelimeter beaker covered with silicone grease and stored for 24 hours at 4°C. The penetration is measured in mm. (maximum penetration = 20mm.) by means of an automatic penetrometer AP 4/1 (VEB Feinmess, Dresden) using a standardized penetration body (weight 10 g.) and a predetermined penetration time (5 sec.). For the determination of the melting behavior, 10 ml. of the solutions having different dry substance contents are poured into beakers and the gelatinization is effected in the refrigerator within 24 hours. The beakers are placed individually in a roomy water bath heated to 80°C and the gel is melted under stirring with a thermometer and the change of consistency is observed. As a melting point is considered the temperature at which the liquid phase is formed and mixing of the gel is possible. As the clear point is considered the temperature at which the sol appears optically clear. Some of the gel properties are indicated in the following table as a function of the dry substance content.

| Dry substance content (%) | Consistency characteristic | Penetration of standard body (mm.) | Melting point (°C) | Clear point (°C) |
|---|---|---|---|---|
| 13.8 | pulpy | 20.0 | — | 59 |
| 18.4 | " | 20.0 | — | 59 |
| 23.0 | pasty | 17.7 | 52 | 65 |
| 27.5 | " | 5.7 | 55 | 66 |
| 32.1 | " | 1.7 | 58 | 68 |
| 36.7 | cutting-hard | 0.5 | 60 | 70 |
| 41.3 | " | 0.3 | 60 | 70 |
| 45.9 | " | 0 | 60 | 70 |

EXAMPLE 5

Corresponding to the procedure indicated in Example 3, 170 g. potato starch (15.6% moisture) are stirred with 328 ml. water to form a homogeneous suspension and hydrolyzed with 0.27 ml. Novo bacterial-α-amylase Liq. 60 in the Brabender Viscograph. The SHP obtained does not solidify on cooling and has a DE of 9.2%. Into 100 g. of the cooled hydrolyzate are stirred 4 g. native potato starch and 0.1 g. citric acid. The mixture is brought to a boil under stirring and heated under reflux for 80 minutes in a boiling water bath. The reaction mixture obtained forms a pasty, thermo-reversible gel after cooling.

EXAMPLE 6

490 g. of the SHP enzymatically prepared in the Brabender Viscograph according to Example 3 are converted by freeze-drying into a dry product, and the mixtures indicated in the table below are produced with soluble starch (Zulkowski starch):

| Amount of SHP with DE = 9.2% (g.) | Amount of Zulkowski starch (g.) | Consistency characteristic | Penetration of standard body (mm.) |
|---|---|---|---|
| 30 | 0 | viscous | 20.0 |
| 27 | 3 | pasty | 14.5 |
| 26 | 4 | " | 12.9 |
| 25 | 5 | " | 10.5 |
| 24 | 6 | " | 7.8 |

The mixtures are boiled after addition of 70 g. water under stirring. After being poured into suitable measuring vessels, the samples are stored in the refrigerator for 24 hours at 4°C, and the penetration of a standard penetrometer body is measured according to Example 4. The penetrometer values obtained are indicated in the last column of the table and are a function of the mixing ratio.

EXAMPLE 7

In 75 ml. water are dissolved after slight heating 25 g. of the SHP produced according to Example 1, 0.5 g. common salt, 0.015 g. sodium benzoate, as well as 0.085 g. benzoic acid, and after cooling 1 g. diacetyl-containing butter flavor is added. As soon as the gel has formed in the refrigerator, 66 g. margarine or butter or a mixture of these fats are stirred in. This product has the consistency of natural, spreadable fats, is equally spreadable at room temperature and at refrigerator temperature, and the water bound in the gel (about 53% by weight) does not separate when the product is spread on bread. The fat content of this product is 32% by weight, it contains about 360 kcal./100 g. By adding eggs, sugar, flavor, and colorants, the product can be processed into various creams (e.g., frostings and fillings) for baked goods and desserts.

EXAMPLE 8

In 63 ml. water are dissolved at 80°C 27 g. of the SHP produced according to Example 2 together with 50 g. sugar, various spices (vanillin, nutmeg, cinnamon, clove, cardamon, and the like) are added and the mixture is stirred, after cooling to about 40°C, with a cocoa pap consisting of 25 g. oil-free cocoa powder (Van Houten cocoa), 5 g. butter and 60 ml. milk by means of an egg beater. Upon standing overnight in the refrigerator, the mixture forms into a pulpy fluid mass which can be used as a dessert, candy filling, creme for baked goods, or as a bread spread. The fat content of this chocolate mass is about 4% by weight and contains about 209 kcal./100 g.

EXAMPLE 9

In a homogenizer are mixed intensively 24.8 g. sunflower oil, 15.1 g. yellow egg powder, 4.7 g. aromatic vinegar, 3.0 g. sugar, 3.0 g. mustard, 2.25 g. salt, 0.15 g. sodium benzoate and 0.15 g. potassium sorbate, and subsequently 100 g. of the SHP hydrolyzate produced according to Example 1 are added under continued homogenization. After the secondary valence gel has formed in the refrigerator or at room temperature, the resulting mayonnaise is cutting-hard. It contains 17.2% by weight fat and 272 kcal./100 g.

EXAMPLE 10

25g. cheese (Tollenser type) having a fat content of 25.2% and a protein content of 29.5% are heated together with 10 ml. water and 0.5 g. melting salt to 85°C and the mixture is cooled to 50°C after complete melting. At this temperature 35.5 g. of a SHP gel, consisting of 25 g. SHP (produced according to Example 1), 0.025 g. Dimodan emulsifier and 75 g. water are stirred in without further heating, and the initially pulpy, fluid mass is placed in a refrigerator. After 48 hours the mass is spreadable. It contains 8.9% fat and 173 kcal./100 g.

EXAMPLE 11

1000 g. seasoning having a dry substance content of 43% by weight (table salt content of the dry substance = 30% by weight) are dissolved at 80°C after addition of 200 g. of the SHP produced according to Example 2 or any other SHP preparation (having a maximum DE-value of 15%) and dried in a small atomizing plant (water evaporation capacity 2 to 3 kg./hr.) at a feed temperature of 70°C, an air inlet temperature of 180°–210°C and an atomization pressure of 1.3 to 1.5 atm. above atmospheric pressure. The dried product obtained has a moisture content of 6–8%, exhibits no hygroscopy and is completely soluble in water.

EXAMPLE 12

170 g. potato starch (15.6% moisture) are stirred with 328 ml. water to form a homogeneous suspension and the suspension is heated to a temperature of 68°C after setting the pH to 7 and adding 0.22 ml. Novo bacterial-α-amylase Liq. 60 to the suspension in a Brabender Viscograph according to the schedule in Example 3. After maintaining this temperature for 5 minutes, the charge is heated to 80°C, maintained at this temperature for 15 minutes, and then heated to 90°C. The charge is poured into a beaker, boiled for 15 minutes and the solids which precipitate are separated by centrifuging. A pH of 4.5 is set by means of 2 N hydrochloric acid and the charge is cooled to 55°C. The hydrolyzate obtained has a DE-value of 12.8%. For the further degradation of the hydrolyzate, glucoamylase is added in an amount of 18 I.U. per gram dry starch substance and the glucoamylase-containing hydrolyzate is incubated for 24 hours at 55°C. After inactivation of the glucoamylase, the precipitated solids are separated by centrifuging. The hydrolyzate obtained now has a DE-value of 97.8% and consists primarily of dextrose. In 400 ml. of the hydrolyzate are dissolved under stirring and heating 40 g. saccharose, 4 g. citric acid, 0.5 ml. of a 10% aqueous solution of egg yellow color, 2 g. lemon oil and 220 g. of the SHP prepared according to Example 2. By dehydration by means of freeze-drying, a lumpy, dry preparation is obtained which can readily be reduced by grinding to a non-hygroscopic powder.

For the preparation of an easily digestible dessert, 1 part by weight of the dry preparation is dissolved in 2 parts by weight water and the solution is gelled in the refrigerator.

What is claimed is:

1. Method of producing a starch hydrolysis product having a dextrose equivalent of at least 5% but below 25% and which forms with water, white, glossy thermoreversible gels having a neutral taste, which are stable to freezing and defrosting and the consistency of which can be varied from pasty to cutting hard, comprising suspending in water a starch or water soluble starch derivative in a concentration of 15–50% by weight and the starch-hydrolyzing enzyme bacterial α-amylase in a concentration within a range which is optimum for hydrolysis of the starch by the enzyme to produce said starch hydrolysis product, adjusting the pH of the suspension to a value of about 7, which is optimum for hydrolysis of the starch by the enzyme to produce said starch hydrolysis product, heating the suspension from a temperature of 55°C to a temperature of 70°C. in a period of 5 to 30 minutes, heating the suspension from a temperature of 70°C. to a temperature of 95° to 100°C. in a period of 5 to 20 minutes and maintaining the suspension at the latter temperatures for 5 to 20 minutes, whereby a precipitant is formed and the supernatant liquid is a solution of said starch hydrolysis product, and separating the precipitant from the supernatant liquid.

2. Method according to claim 1, further comprising cooling the starch hydrolysis product solution to room temperature thereby to form a gel of the starch hydrolysis product.

3. Method according to claim 1, further comprising dehydrating the starch hydrolysis product solution thereby to obtain the starch hydrolysis product in solid form.

4. Method according to claim 1, in which the starch is bulb or root starch.

5. Method according to claim 1, in which the water soluble starch derivative is a phosphate starch or an acetyl starch.

6. Method according to claim 1, in which the water soluble starch derivative is a pretreated starch or a starch modified with ions.

7. Method according to claim 6, in which the water soluble starch derivative is a calcium ion-modified starch.

8. Method according to claim 1, in which the starch is potato starch.

9. Method according to claim 8, in which the concentration in which the potato starch is suspended in the water is 25 to 35%, by weight.

10. Method according to claim 1, in which the period in which the suspension is heated from 70°C to temperatures of 95 to 100°C is 12 to 15 minutes.

11. A starch hydrolysis product produced by the process of claim 1.

12. Foodstuff containing the product of claim 11.

* * * * *